US011347896B1

(12) United States Patent
Brown, Jr. et al.

(10) Patent No.: US 11,347,896 B1
(45) Date of Patent: May 31, 2022

(54) HORIZONTAL SCAN DETECTION

(71) Applicant: Amazon Technologies, Inc., Seattle, WA (US)

(72) Inventors: Dennis Naylor Brown, Jr., Seattle, WA (US); Eric Dawson LaMothe, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 66 days.

(21) Appl. No.: 14/738,693

(22) Filed: Jun. 12, 2015

(51) Int. Cl.
*G06F 21/55* (2013.01)
*G06F 21/73* (2013.01)

(52) U.S. Cl.
CPC ............ *G06F 21/73* (2013.01); *G06F 21/552* (2013.01)

(58) Field of Classification Search
CPC ............. H04L 63/1416; H04L 63/1425; H04L 63/1408; H04L 63/1433; H04L 63/1475; H04L 63/1466; H04L 63/20; G06F 21/552; G06F 21/73
See application file for complete search history.

(56) References Cited

U.S. PATENT DOCUMENTS

| | | | | |
|---|---|---|---|---|
| 6,031,821 A * | 2/2000 | Kalkunte | ................. | H04L 47/10 370/235 |
| 6,751,225 B1 * | 6/2004 | Chung | .............. | H04L 12/40013 370/401 |
| 6,971,028 B1 * | 11/2005 | Lyle | ...................... | G06F 21/554 709/224 |
| 7,624,447 B1 * | 11/2009 | Horowitz | ............ | H04L 63/0263 726/23 |
| 7,908,655 B1 * | 3/2011 | Bhattacharyya | .... | H04L 63/1475 726/22 |
| 8,271,700 B1 * | 9/2012 | Annem | ................... | G06F 13/28 710/26 |
| 8,516,573 B1 * | 8/2013 | Brown | ................ | H04L 63/1416 726/22 |
| 2005/0160335 A1 * | 7/2005 | Peterson | ............. | H04L 63/1433 714/724 |

(Continued)

OTHER PUBLICATIONS

"Intrusion Detection System," Wikipedia, The Free Encyclopedia, <http://en.wikipedia.org/w/index.php?title=Intrusion_detection_system&oldid=662942984> [retrieved May 2015], 8 pages.

(Continued)

*Primary Examiner* — Trang T Doan
(74) *Attorney, Agent, or Firm* — Davis Wright Tremaine LLP

(57) ABSTRACT

Horizontal port scanning enables an attacker to gain information about the services running on a host computer system and/or about the users of the computer system so that the subsequent attacks can be targeted to those services and/or those users. A horizontal port scanning detection system enables a network administrator to use a system of cascading ring buffers to maximize network resources to detect attackers. The horizontal port scanning system employs a series of ring buffers, where each ring buffer is associated with a specific port and each cascade of ring buffers is associated with a specific source. As communications requests are received, the destination address is stored in the ring buffer associated with the requested port and a process is run across each ring buffer, such that when a threshold is passed, an alarm is raised.

20 Claims, 9 Drawing Sheets

(56) References Cited

U.S. PATENT DOCUMENTS

| | | | | |
|---|---|---|---|---|
| 2008/0196099 A1* | 8/2008 | Shastri | H04L 69/163 | 726/12 |
| 2009/0044276 A1* | 2/2009 | Abdel-Aziz | H04L 63/145 | 726/24 |
| 2009/0064332 A1* | 3/2009 | Porras | H04L 63/1425 | 726/23 |
| 2011/0055921 A1* | 3/2011 | Narayanaswamy | H04L 63/1458 | 726/22 |
| 2012/0315893 A1* | 12/2012 | Weppler | H04L 41/5022 | 455/424 |
| 2015/0033322 A1* | 1/2015 | Wang | H04L 63/0254 | 726/13 |
| 2015/0264078 A1* | 9/2015 | Beauchesne | H04L 63/1408 | 726/23 |
| 2016/0127390 A1* | 5/2016 | Lai | H04L 43/026 | 726/23 |

OTHER PUBLICATIONS

"Intrusion Prevention System," Wikipedia, The Free Encyclopedia, < http://en.wikipedia.org/w/index.php?title=Intrusion_prevention_system&oldid=652729170> [retrieved Mar. 2015], 3 pages.

\* cited by examiner

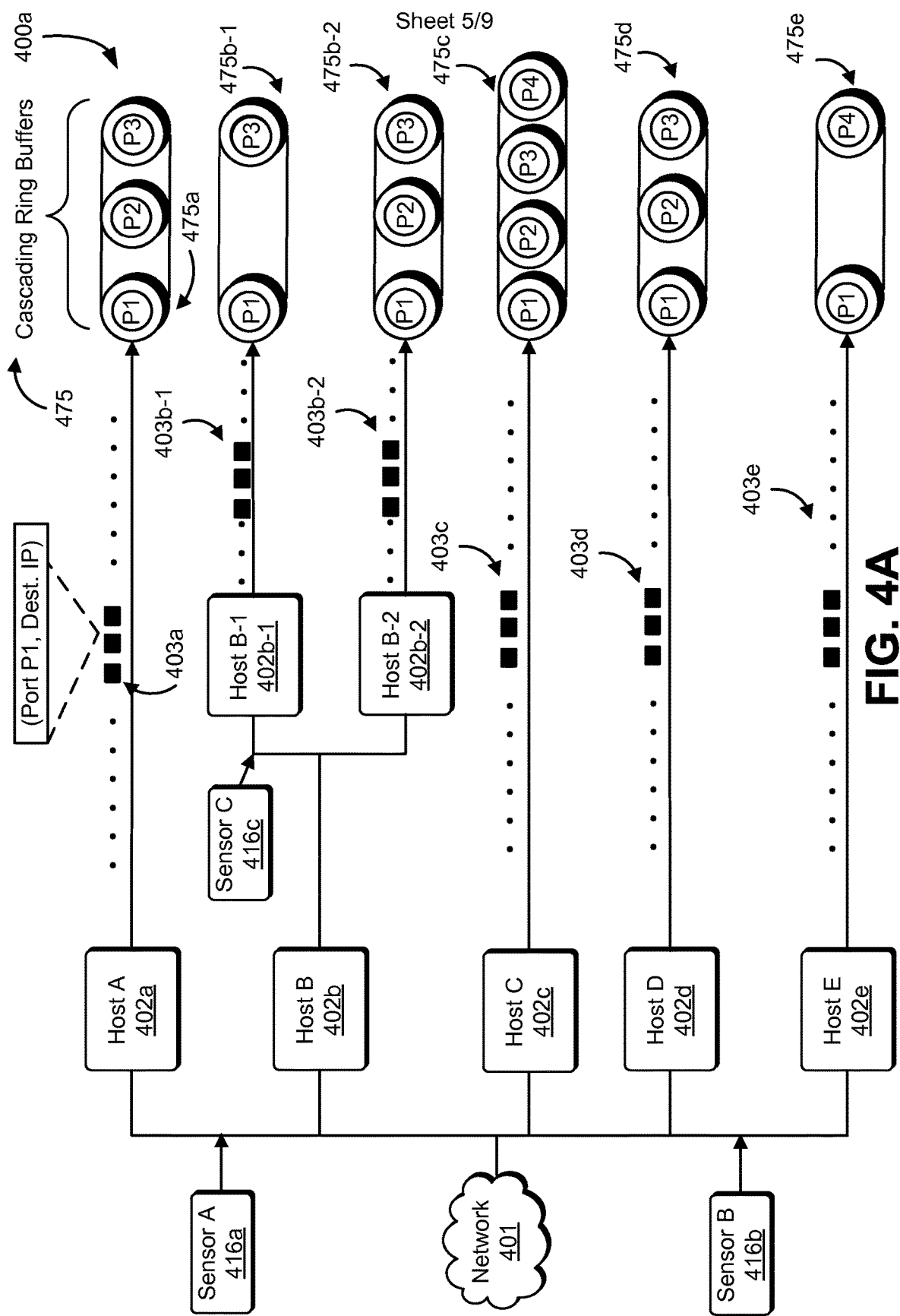

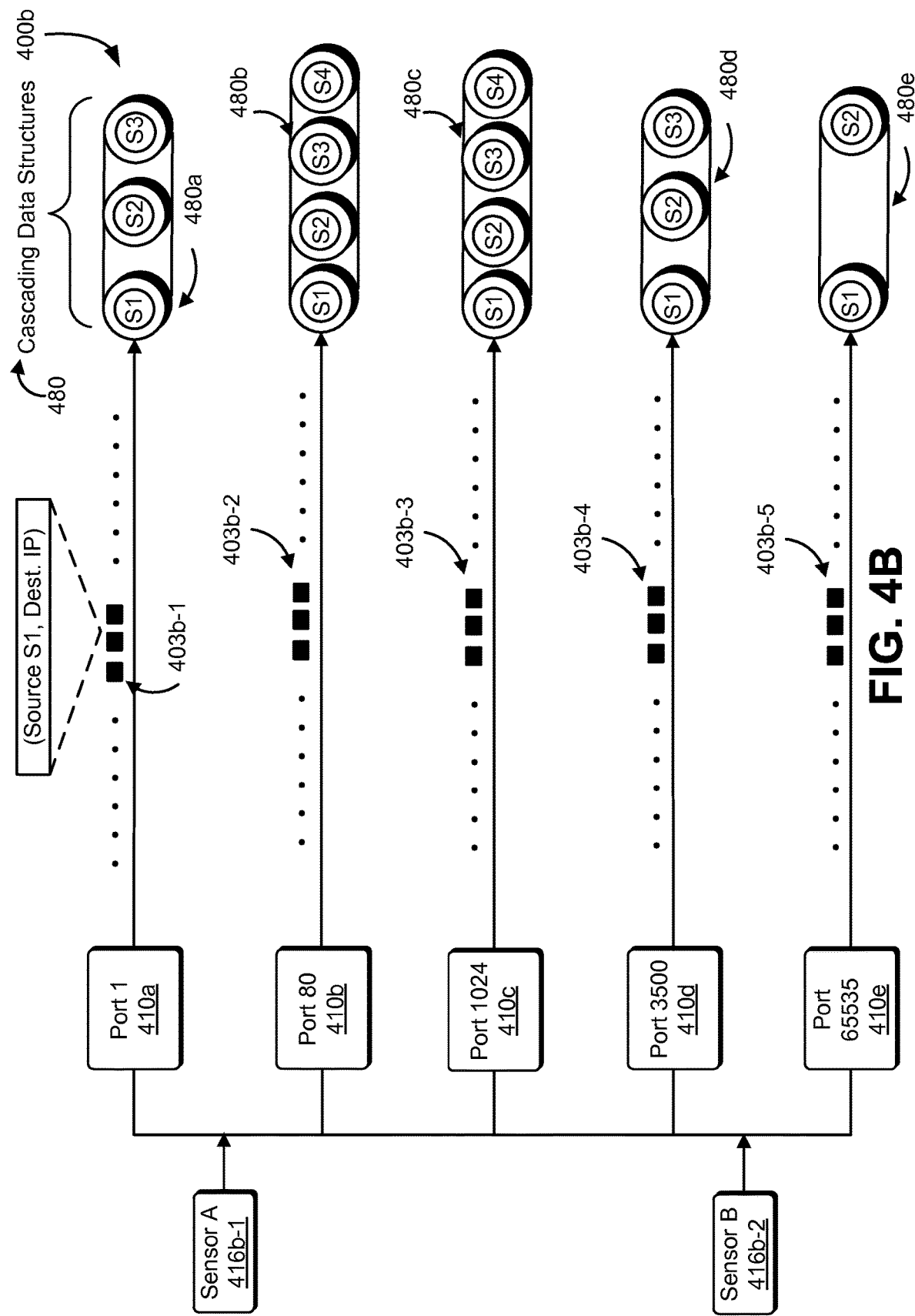

HORIZONTAL SCAN DETECTION

BACKGROUND

Organizational computer networks are often under attack by malicious users. One method by which an attacker may use to find vulnerabilities in a network is called horizontal port scanning, and it is a very difficult task to recognize instances of malicious port scanning. In a network security setting, horizontal scans are defined as a system attempting to connect to multiple different systems on the same port (or looking for the same service). This is a difficult problem to solve that grows increasingly more complex in relation to the size of a network. When a horizontal port scanning occurs, it is usually a misconfigured server or a malicious party attempting to find vulnerable services within a network, detection of horizontal scans is important for both the health and security of the network. One of the challenges of detecting horizontal port scans includes resource cost, because tracking all network events may help determine an attack, but such large-scale tracking causes memory and processing issues, rendering it a costly endeavor.

BRIEF DESCRIPTION OF THE DRAWINGS

Various embodiments in accordance with the present disclosure will be described with reference to the drawings, in which:

FIG. 4A is an illustrative example of an environment depicting communications traffic transmitted from multiple hosts of a network to cascading ring buffers in accordance with at least one embodiment;

FIG. 4B is an illustrative example of an environment depicting communications traffic transmitted via multiple port numbers in accordance with at least one embodiment;

DETAILED DESCRIPTION

Figure 1:
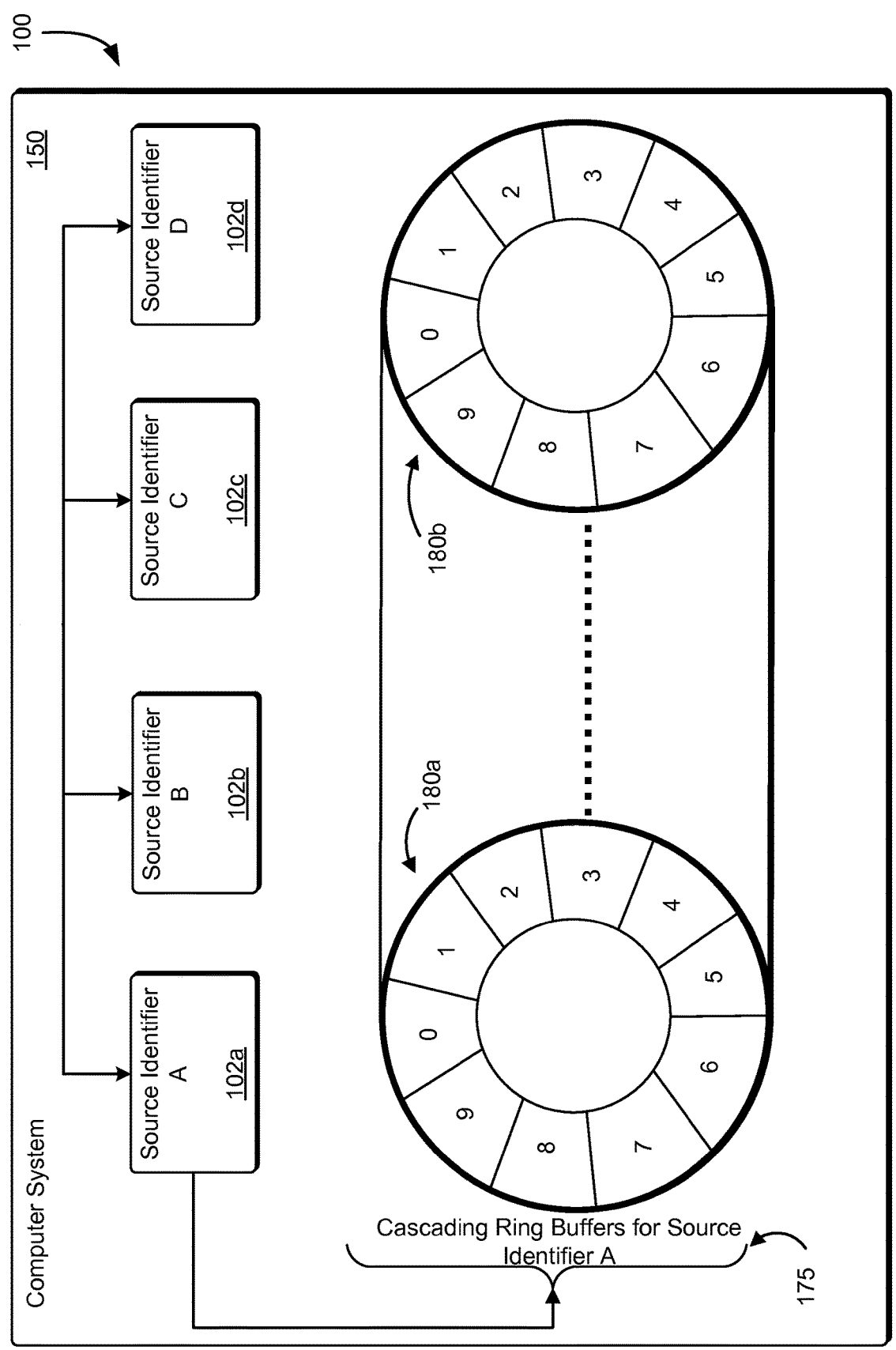
FIG. 1 is an illustrative example environment where attacks on computer systems may be detected and managed in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems, and processes for detecting attacks on computer systems. In particular, techniques are disclosed for utilizing computer system capabilities to identify port-scan attacks of a single port across multiple network addresses (referred to as horizontal port scanning) using cascading ring buffers. Port scanning may be used by network administrators for non-malicious reasons, such as network discovery and network security verification; however, horizontal port scanning is commonly used by attackers for malicious intents to locate and exploit network vulnerabilities. A horizontal scan is a type of port scan that targets the same port on several hosts, which can enable an attacker to find a global vulnerability across a network. A port is always associated with a protocol address (such as an Internet protocol (IP) address) of a host and the protocol type of the communication being transmitted over the port. As there are $2^{16}$ port numbers (0 to 65,536) used by Transport Layer Protocols (e.g., Transmission Control Protocol (TCP) and User Datagram Protocol (UDP)), horizontal scanning detection is difficult and expensive to detect and maintain information about.

To reduce the cost and resources associated with detecting horizontal scans, a system of cascading ring buffers may be implemented to maximize computing resources available on a network. Each port, of up to the 65,535 available ports, may have an equally sized ring buffer assigned to it, where each ring buffer provides a historical view of the connections on that specific port for a period of time. The system of cascading ring buffers provides for multiple ring buffers associated together based on a source network address (e.g., source IP address) of the host (e.g., an attacker) transmitting requests.

For example, an attacker (e.g., the source host) may transmit ten communications requests to ten different network hosts (e.g., ten different destination IP addresses of hosts within a network) on the same port. In such an example, there would be one ring buffer created and associated with that port. In another example, an attacker may transmit ten communications requests to ten different network hosts on a first port, five communications requests to ten different network hosts on a second port, and three communications requests to five different network hosts on a third port. In such an example, three ring buffers would be created (one for each port) and these three ring buffers would be associated as a cascade of ring buffers, the cascade being associated with an address of source host. In other words, the address associated with the source host (e.g., the source IP address) is a key value by which all data in the ring buffers is organized.

As, in some examples, a ring buffer is created each time a new port is requested, there may be up to 65,535 ring buffers associated with each source host. A ring buffer may be configured with equal sized elements (also referred to as slices), which are memory-allocated slices to store data as it is directed toward the buffer. Each slice is used to store some information received in the communications requests for the source host. For example, if the source host transmits a communications request to ten destination hosts on the same port, each destination IP address for each of the ten destination hosts is stored in a slice of the ring buffer. Once a ring buffer is filled (e.g., each slice of the ring buffer has data stored), the ring buffer, upon receiving next data, will automatically overwrite the oldest data in the buffer with the newest data. In alternative cases, buffer management routines or applications using the ring buffer may be configured to prevent overwriting of certain data.

As multiple ring buffers may be created or maintained in a one-to-one ratio based on the number of ports accessed, each ring buffer may fill at different times and at different rates depending on the port. For example, commonly-used ports (such as system ports 0-1023) may receive large numbers of requests whereas lesser used ports (such as registered ports and dynamic/private ports, port numbers 1024-65535) may receive little or no requests during the same time periods. As such, well-known ports may be frequently accessed causing the associated buffers to have a fast fill rate (e.g., quickly filling all of the allocated memory in the buffer). Similarly, lesser-used ports may be accessed less frequently causing the associated buffers to have a slow fill rate (e.g., only fill some of the allocated memory in the buffer) or not fill at all. The ring buffers associated with the lesser-used ports will maintain data in memory for longer periods of time, enabling a system administrator to determine possible slow-rate attacks, such as a "Low and Slow" attack, which involves apparently legitimate communications requests being made at a slow rate.

As the communications requests are monitored and the destination IP addresses are stored in the slices of the ring buffers, a process may be run across each ring buffer to tally or count the number of connections realized by the source IP address. A user, such as a network administrator, may define a threshold number of destination IP addresses and, once that threshold value is reached or exceeded, an alarm may be triggered. For example, the determination of a horizontal scan, possible horizontal scan, or suspicious behavior may be made by a program, service, module, and/or application running on the host computer system such as, for example, by a security service or detection service that is configured to monitor computer systems and send an alarm when such circumstances are detected.

A detection module may further generate a report to provide to a user (e.g., a network administrator) in order to provide the user with data related to possible port scanning. Such examples may provide an efficient manner in which to store traffic or communications data in memory, provide short-term data related to the busiest ports, and long-term data for lesser-used ports. A horizontal scan detection system as described above may further employ other network services in order to collect additional data. For example, as the system primarily uses two elements of a connection (i.e., the IP addresses and destination ports), data sets may be retrieved from other network sources, such as firewalls, network monitors, traffic reports, routers, and the like.

FIG. 1 is an example embodiment of a network environment 100 for implementing aspects in accordance with various embodiments. As will be appreciated, although a network environment 100 is used for purposes of explanation, different environments may be used, as appropriate, to implement various embodiments.

A host computer system, which may be one of a plurality of host computer systems running within a computer system environment, may have one or more services, processes, and/or applications running on the system and may also have one or more users of the system. Each of the services, processes, and/or applications (referred to simply as "services") may have one or more ports that it may use to, for example, connect to other computer system services via a computer system network. The computer system network may, for example, be a local network, an internal network, a public network such as the Internet, a wide-area network, a wireless network, a mobile network, a satellite network, a cellular network, a distributed computing system with a plurality of network nodes and/or other such networks.

A computer system port is a network communications endpoint under the control of a host computer system operating system. A port may be associated with an internet protocol (IP) address such as an IPv4 or IPv6 address, a port number assigned by the host operating systems, a port type also assigned by the host operating system and/or other such computer system associations. Ports may be used in modern computer systems to allow multiple services to share a single connection to a network by allowing those services to be uniquely associated with certain ports, thereby forwarding all port-addressed network connections to the uniquely associated services. Common port types include, but are not limited to, user datagram protocol (UDP) ports and transmission control protocol (TCP) ports (also referred to as transmission control protocol/Internet protocol (TCP/IP) ports). A port may be used by a host computer system to receive connections, or to receive data, or to initiate connections, or to wait for processes in other systems to complete, or to receive and process commands or for a combination of these and/or other such computer system functionality.

Certain ports of a host computer system may be well known to allow remote computer systems to access certain well-known services on a host computer system. For example, a host computer system may receive connections on TCP port 80 for hypertext transfer protocol (HTTP) connections allowing the host computer system to deliver webpage content to remote systems. A host computer system may also allow connections to TCP port 25 for simple mail transfer protocol (SMTP) connections allowing the host computer system to receive email traffic from remote systems. A host computer system may also allow connections on a variety of other ports for other such computer services and as may be contemplated, these port numbers and port types are merely illustrative examples. Other computer systems that use other ports and/or other port types for other purposes may be considered as within the scope of the present disclosure.

Generally, hosts, computers, and/or machines are connected to a network and may be configured to run services that use Transmission Control Protocol (TCP) ports or User Datagram Protocol (UDP) ports for communication with other devices on the network (or an external network). There are currently 65,536 distinct and usable standardly defined ports per Internet Protocol (IP) address (although 0 is a restricted port, so 65,535 ports are more commonly thought of). They can be categorized into three large ranges: (i) well-known ports (0-1023), (ii) registered ports (1024-49151), and (iii) dynamic and/or private ports (49152-65535).

In the example environment 100, a computer system network may include source identifiers A-D (102a-102d), which are operably interconnected with other hosts, devices, or applications in a host computer network. Source identifier A 102a may be a source node or source host, where source identifier A is generating communications traffic or requests to other hosts on the network, the traffic including the destination IP addresses of the other hosts and the port(s) number that source identifier A is connecting to for a service initiation. An attacker, such as source identifier A 102a, may initiate an attack such as a horizontal port-scan attack by first issuing a connection request to a port on the host computer system 150. As used in the present disclosure, the term "attacker" may be used to refer to single computer system users, computer systems, sets of computer users, sets of computer systems, computer system processes, computer system programs, computer system accounts, computer system profiles, computer system services and/or combinations of these and/or other such attacker elements.

Source identifier A may issue a connection request to the port on 10 different host computers within the network, and from each connection request, the destination address of the 10 different hosts would be stored in the ring buffer 180a.

The ring buffer 180a is created and/or maintained for all requests being transmitted to the port via source identifier A and the ring buffer 180b is created and/or maintained for all requests being transmitted to a different port via source identifier A. As both ring buffers 180a and 180b are designated for storing data of traffic originating from source identifier A, the two ring buffers are arranged and/or associated with each other as a cascade of ring buffers 175 for source identifier A.

In another example embodiment of the computer system of FIG. 1, the source identifier A 102a may be a port number, where the source identifier A is used to provide multiplexing services on each port number that a source host connects to for communications, where the traffic from a source IP address being transmitted via the port number (source identifier A) may include a destination IP address. For example, the computer network may be monitored for potential attackers by tracking the port numbers (e.g., source identifiers A-D (102a-d)) to determine the source hosts that are using those ports to access different destination IP addresses.

Figure 2:
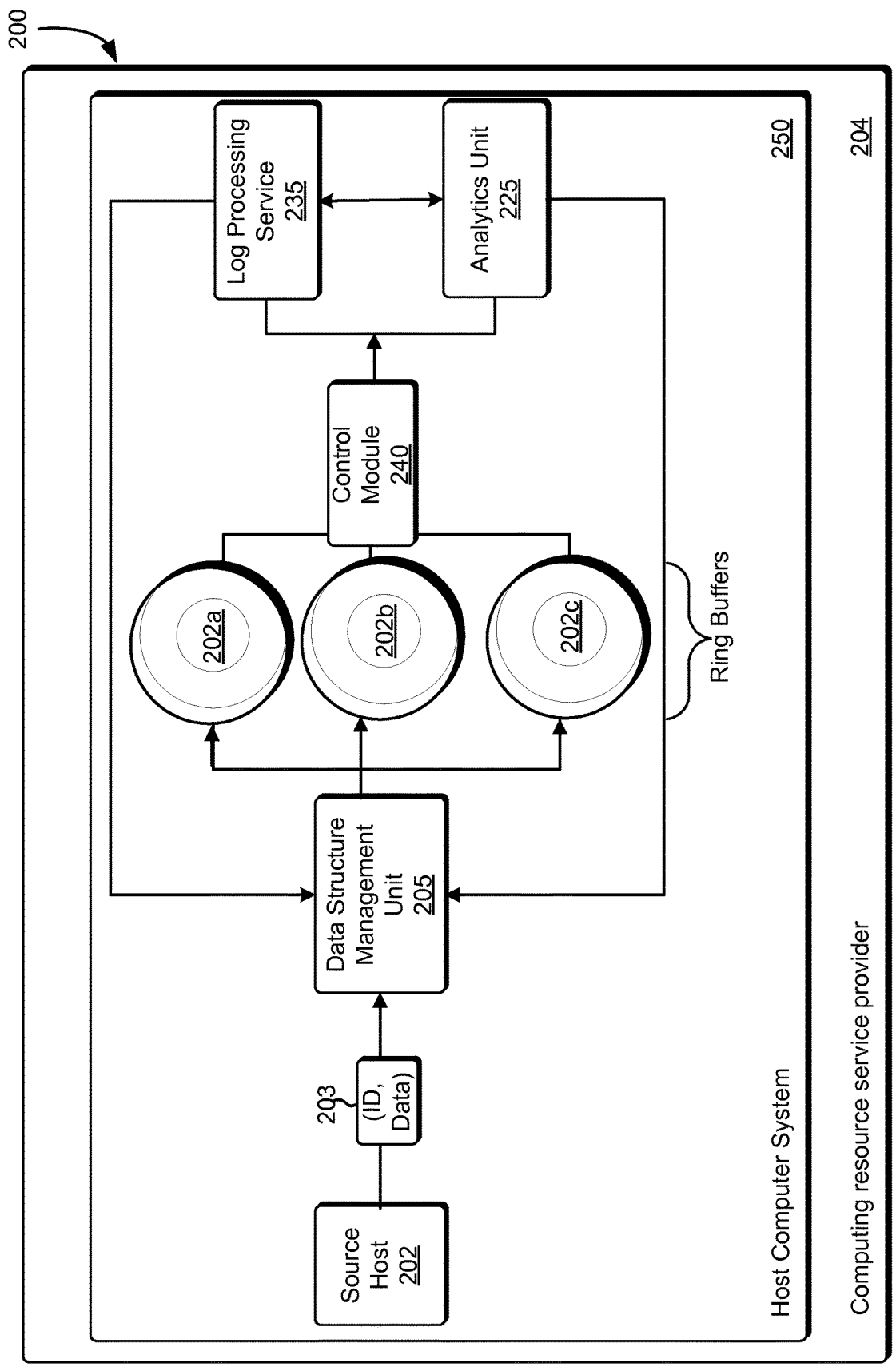
FIG. 2 is an illustrative example of a block diagram depicting a service provider for monitoring communications requests from a host in which various embodiments can be implemented.

FIG. 2 is an illustrative example of a block diagram 200 for detecting horizontal port scanning using cascading ring buffers in accordance with at least one embodiment.

The computing resource service provider 204 may provide access to one or more host machines as well as provide access to computer services such as virtual machine (VM) instances, automatic scaling groups, file-based database storage systems, block storage services, redundant data storage services, data archive services, data warehousing services, user access management services, content management services and/or other such computer system services as may be running thereon. The computing resource service provider 204 may also provide access to computer system resources such as user resources, policy resources, network resources and/or storage resources. In some distributed and/or virtualized computer system environments, the resources associated with the computer services may be physical devices, virtual devices, combinations of physical and/or virtual devices or other such device embodiments. In some embodiments, the host machines, such as source host 202, may be physical machines located within the computer system environment. In some embodiments, the host machines may be guest virtual machines operating on physical machines located within the computer system environment. A host computer system 250, running in a computing resource service provider, may include one or more computer system operational elements running on one or more computer systems as part of a distributed, virtualized, and/or datacenter environment.

A source node, such as a source host 202, may initiate an attack such as a horizontal port-scan attack against a host computer system 250 running within a computing resource services provider 204 in accordance with at least one embodiment. The source node may be configured in the private network of the host computer system or may be configured in a public network, such as the Internet, accessing the host computer system via a connection. The source host 202 may further be identified according to a source identifier or origination information, for example, a source Internet protocol (IP) address, an e-mail address, a telephone number, an application name or other identification information uniquely identifying the source.

The source host 202 may initiate a horizontal port-scan attack by first transmitting a connection request 203 identifying a specific network identifier (such as a port or web server) and a destination identifier or destination information (such as a destination IP address or a unique request for a web server) to a port on the host computer system 250. For example, a user may transmit a request for a network identifier, such as a web server, and in the request, a request identifier is provided as a request for a specific web resource, such as a webpage. The request identifier may be a destination address, such as a destination IP address for the webpage. In some example embodiments, the source host (attacker) may initiate a request to a web server indicating a resource, uniform resource identifier, and data/metadata requested by the host. As one illustrative example, the data or a portion thereof may be input into a one-way function (e.g., a hash function) to generate a hash of the data. For example, the destination IP address or the resource identifier may be input into a hash function in order to generate a hash value, such as an identifier of the destination IP address, of the destination address or other valuable data.

In response to receiving a request, the host computer system may determine, at a data structure management unit 205, whether any ring buffers (such as ring buffers 202a-202c) are available based at least in part on the port requested. The data structure management unit 205 may be a physical host, such as a computer, a server, a host machine, a sensor, or may be a program, service, or application running on the host computer system configured for routing and processing incoming communications traffic. For example, for each port number or communication-specific information that is requested (as described above in reference to FIG. 1), the management unit 205 creates and/or maintains a ring buffer associated with each port number.

As the source host 202 continues sending connection requests 203 to the same port on the host computer system 250, the host computer system may continue storing the destination IP address (or other unique request type) in an element slice of the ring buffer associated with that port number. The data structure management unit 205 is configured to monitor all incoming traffic requests and populate the relevant data into the appropriate ring buffer. As each of ring buffers 202a-202c is populated with respective data, a control module 240 may be operably interconnected with the ring buffers to monitor and analyze the data stored in the ring buffers over a certain time period.

The control module 240 can be configured to count/measure the size of one or more buffers based on the data stored in each slice of each buffer in order to identify outlier data, such as data that appears suspicious, anomalous, abnormal, etc. that may indicate a horizontal port scan. The control module 240, which may be a program, service, or application running on the host computer system, may be configured, according to example embodiments, to count (e.g., compile, aggregate, or collect) the entries (e.g., destination IP addresses, unique identifiers, etc.) stored in each buffer to determine the size of each buffer in order to help identify possible horizontal port scanning of a network.

Example embodiments of the control module may perform horizontal port scan detection by aggregating the size of each buffer in a horizontal direction (described in detail below in connection with FIG. 4A). In other example embodiments, a control module may perform horizontal port scan detection by aggregating the size of each buffer in a vertical direction (described in detail below in connection with FIG. 4A).

The control module may be operably interconnected with a log processing service 235, which may be a program, service, or application running on the host computer system, configured to process information received from the control module. While the control module may detect an attacker or performance of a port scan, the information may be recorded in the log processing service in order to raise an alarm regarding possible or actual threats and provide historical data records for comparing to new threats. The processing service 235 may include a data store (not shown) as a mechanism for storing log data that is used for reporting, analysis, and other detection reasons. In some examples, a "log" may be a file system log, which is a data structure of a log-structured file system to which records may be appended sequentially.

As a result of logging attack attempts, the host computer system 250 may determine that the attacker (source host 202), the associated computer system client device, and/or the associated connection are associated with one or more malicious acts (e.g., horizontal port scans) and may begin to respond accordingly. The host computer system may continue logging the connection requests with the log processing service 235, which may continue accumulating suspicious connection requests from the suspected attacker (source host 202). Example embodiments may include the control module 240 or other component creating a log or profile based on the attacks and/or possible attackers. For example, an attack profile may be created based on different attacks occurring on a computer system.

The log processing service may further be operably interconnected with the data structure management unit 205 and configured to return historical data to the management unit. In some embodiments, the host computer system may detect that an attack is occurring after a certain system-determined amount of suspicious behavior is attempted based at least in part on the historical or log data provided from the log processing service to the data structure management unit. In some example embodiments, the detection, log processing, data structure population, and/or reporting elements may be performed by the same or different entities, such that multiple processes may occur simultaneously across multiple entities in order to save processing time, memory allocation, and other network resources.

An analytics unit 225, which may be a program, service, or application running on the host computer system, is configured to use heuristics and metrics to help detect horizontal port scanning, based on historical data stored in the log processing service, and provide additional information or possible detection patterns based thereon. In some example embodiments, the host computer system may operate in accordance with information received from the analytics unit that identifies some behaviors being less suspicious than other behaviors. The host computer system, in some embodiments, may further maintain a system policy subsystem that uses tracked behaviors to evaluate the potential risk of attack from a computer system based at least in part on receiving analytics, metrics, and heuristics data from the analytics unit 225.

In further example embodiments, machine-learning algorithms may be utilized by the analytics unit 225 to optimize the horizontal port scanning detection. For example partially-labeled supervised learning algorithms, feature selection machine learning algorithms, model selection machine learning algorithms, and the like may be employed to determine which types of behavior stored in the ring buffers is more or less likely to be false data (not actual port scans, or non-malicious port scanning by a system administrator).

One of the advantages that an attacker may gain in performing information gathering techniques such as port scans is to attack more efficiently by focusing the attack on fruitful targets. In alternative example embodiments, this advantage may be removed by making the attacker believe (i.e., by presenting to the attacker information that indicates) that a number of the ports (e.g., a majority) on a host computer system, including ports otherwise not in use (e.g., not in use except in response to an attack), are fruitful targets. The host computer system may provide the attacker (source host) with an overwhelming number of targets by accepting connections on ports that may generally not accept connection. Each connection to a generally unused port may respond to the connection request, thereby presenting to the attacker that there is a service associated with that port by, for example, returning a false service header and one or more false service responses. The host computer may provide these false positive connections by altering the behavior of the host operating system and, rather than not responding to requests on unused ports, may instead respond to requests on unused ports.

The host computer system 250 may further include monitoring memory utilization and processing. For example, the host computer system or a component thereof may monitor, track, and/or record percentage of disk space utilization, percentage of CPU utilization, percentage of memory utilization, network out utilization and other system metrics. The system 250 may further be configured to monitor the percentage of memory utilization and a rate-of-change of the memory utilization based on the number of hosts being tracked. The system 220 or a component thereof may further monitor data coming in, processing speed, memory usage, and the like.

Figure 3A:
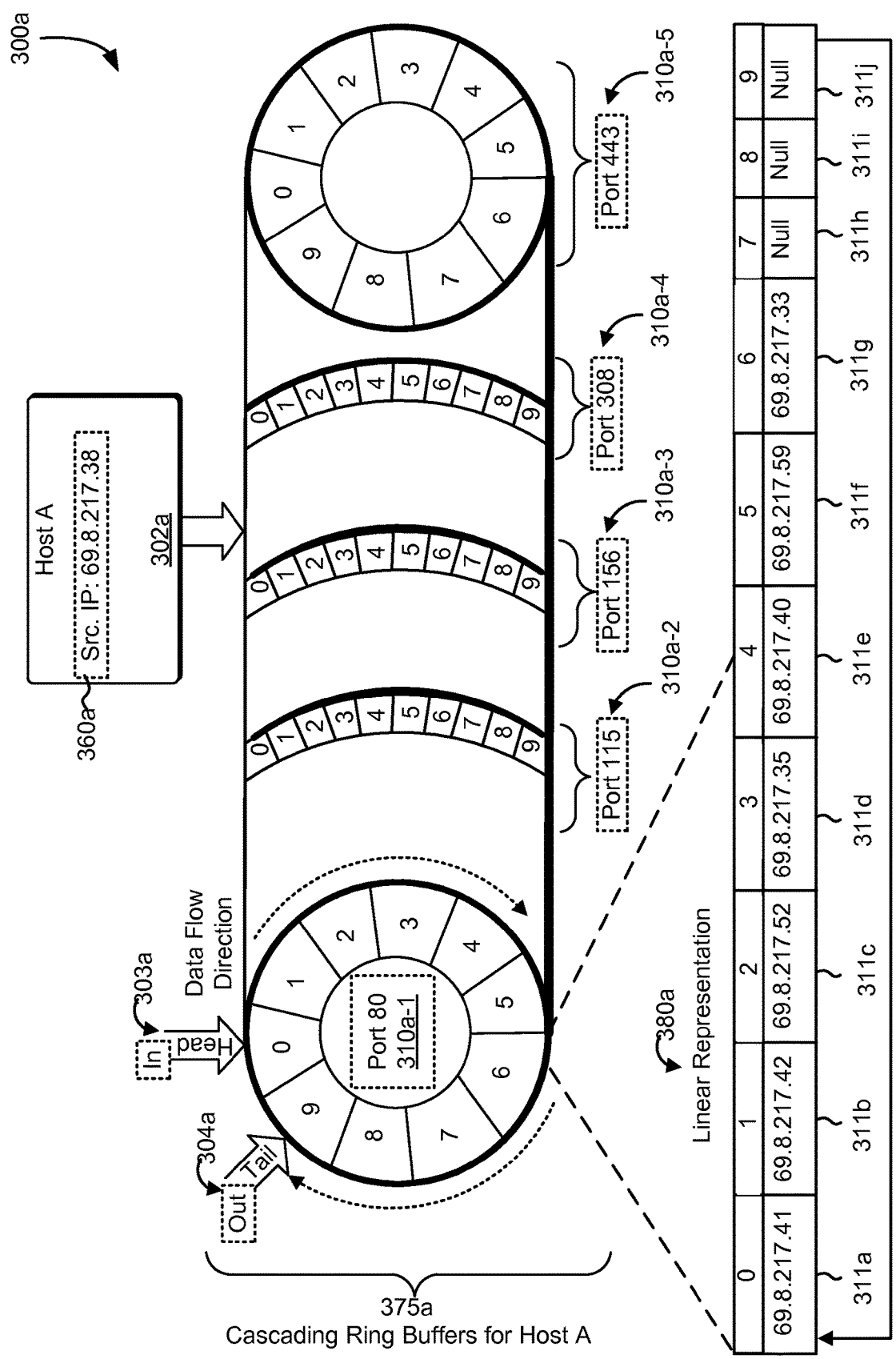
FIG. 3A is an illustrative example of an environment depicting cascading ring buffers in accordance with at least one embodiment.

FIG. 3A illustrates an example environment 300a depicting cascading ring buffers associated with a source Internet protocol (IP) address where the ring buffers are identified in a linear representation in accordance with at least one embodiment.

A data structure may be a ring buffer (sometimes referred to as a circular buffer), a rolling queue, a managed queue, a free-form data structure, or a data structure having a size with an enforceable limit (a fixed-size data structure, a preset data structure, constrained variable data structure). Because the ring buffer, such as one of ring buffers 310a-1-310a-5, is size-limited and the oldest data in the ring buffer is the first to be overwritten (for example, due to recording data in a circular fashion), the ring buffer may only store new addresses of destination hosts (such as a destination IP address). For example, as the ring buffer 310a-1 is populated with addresses, a system element may perform a redundancy check on the ring buffer entries, and if a destination IP address already exists in the buffer, it is not added again. However, if the address has cleared out of the buffer, the address, when detected again, will be entered again as a new address.

The data written in at the head index 303a, and the data is read out from the tail index 304a. The ring buffer 310a-1, associated with port 80, can be seen as a linear representation 380a to illustrate how the head and tail index varies in time using a linear array of elements for the buffer. This buffer will collect the data so that at some later time (or in-real time) another process can fetch the data for further processing.

The buffers may be divided into equal, fixed-length slices. Each slice or element of the buffer may be determined based on the available memory being allocated to the buffer and subdivided based on the number of slices. For example, each slice is x-byes and the total buffer is y-bytes, such that when the total buffer is y+1, the last or oldest slice is cleaned or overwritten. For example, a buffer may be allocated 1 KB. The buffer may be configured as a first-in, first-out (FIFO) data structure.

The linear representation 380*a* of the ring buffer 310*a*-1 illustrates an example embodiment of 10 element slices 0-9 (311*a*-311*j*), where element slices 0-6 (311*a*-311*g*) have filled entries including the destination IP addresses contained in the communications request to the same port 80 (310*a*-1). However, element slices 7-9 (311*h*-311*j*) are empty entries that may be shifted to and new entries added. For example, as a new entry (a new destination IP address or other unique request type) is stored in the ring buffer, the entries shift to the next available open element slice, and the new entry is entered into the open entry.

As an attacker continues sending communications requests, from a source host 302*a* with a source IP address 360*a*, to the same port, port 80, on the host computer system, the host computer system may continue storing the destination IP address (or other unique request type) in an element slice 311*a*-311*j* of the ring buffer 310*a*-1 associated with that port number. Each communications request received at the same port 310*a*-1 may continue having the destination IP address (or other unique request type) added into open element slices of the ring buffer 310*a*-1.

Each cascading ring buffer 375*a*, associated with a specific source address, may contain any variable number of ports up to 65535 ports to be included as an element (e.g., buffer) of the cascade. Each time a new source host is detected transmitting communications requests, a new cascade is created for that source host. Each time the new source host transmits a request to a port on one or more hosts, a new buffer is created for that port. When the buffer is first created and until a destination address is entered into the buffer, the buffer is empty and is not using any memory allocated to the buffers.

The size of the buffers may be changed, for example, at runtime, such that the memory allocated to the buffer may be extended and a buffer created for a frequently requested port may be enlarged and/or expanded in order to maintain a greater number of elements (e.g., destination IP addresses) in the buffer. The buffer size may be changed and/or modified in order to be allocated more or less memory manually, automatically, or dynamically in response to different circumstances. For example, manual changes of the amount of memory allocated to a buffer may be designed by a user, such as a network administrator, when a popular port is being requested too frequently, or the available memory allocated to the buffers must be reduced for use in other network resources. Manual or dynamic buffer size may be monitored or evaluated during different time intervals, e.g., every 60 seconds, 120 seconds, five minutes, etc. A dynamic or automatic change the amount of memory allocated to one or more buffers, which may be triggered for rate limiting purposes in order to control the rate of traffic sent or received by a network interface controller.

An automatic or dynamic change to the amount of memory allocated to one or more buffers may be determined based at least in part on velocity checking (e.g., counting request attempts being made), based at least in part on a data transfer rate (e.g., the rate that a certain amount of data is transferred over a given period of time), or based on a given or fluctuating interval.

Figure 3B:
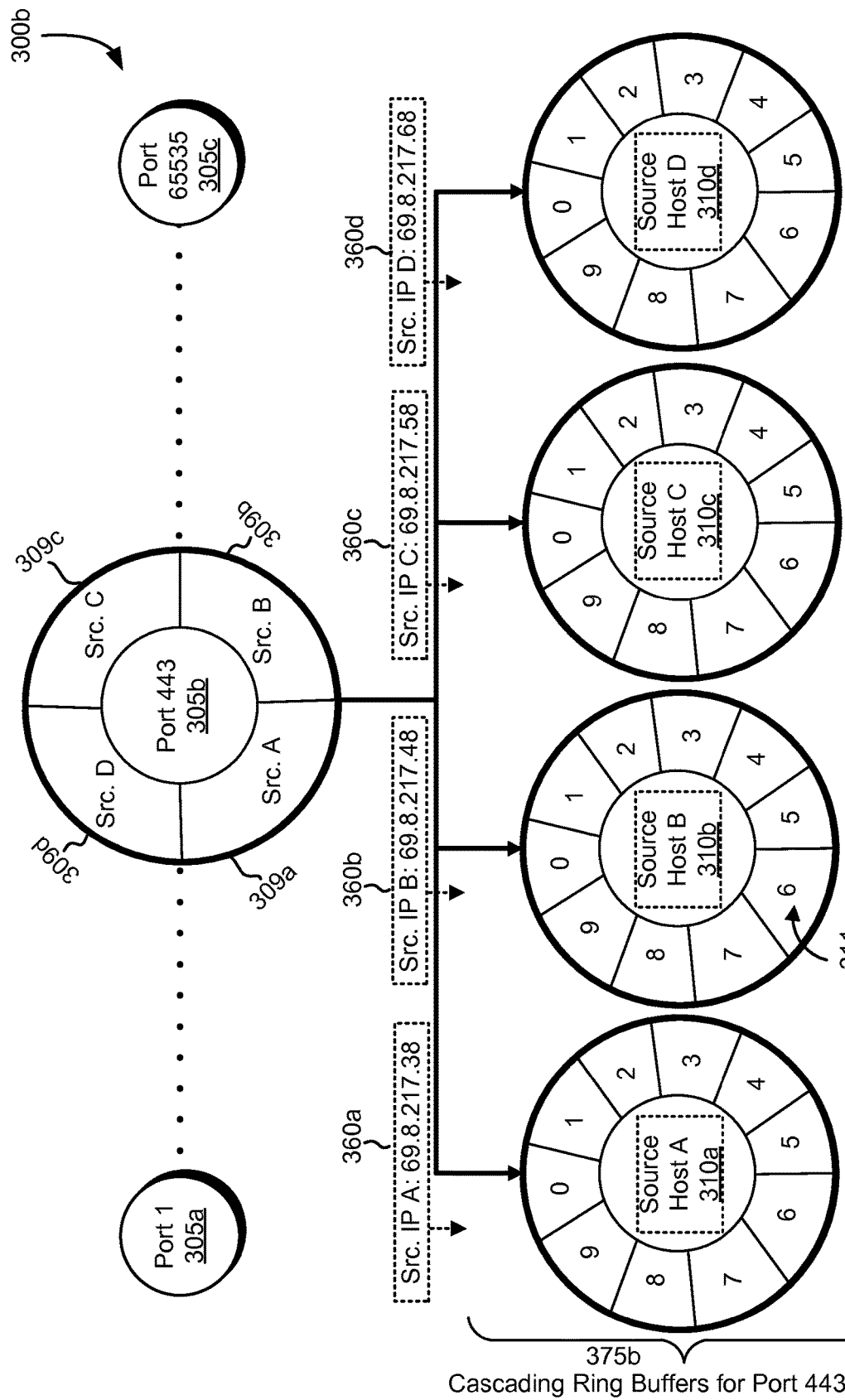
FIG. 3B is an illustrative example of an environment depicting cascading ring buffers in accordance with at least one embodiment.

FIG. 3B illustrates an example environment 300*b* depicting cascading ring buffers associated with a port number where the ring buffers are identified in a linear representation in accordance with at least one embodiment.

Example embodiments of horizontal port scanning according to 300*b* includes creating a buffer for each port, such as the buffers 305*a* for port 1, the buffer (305*b*) for port 443, and the buffer (305*c*) port 65535, as a first layer of an array. Based on each port buffer, a cascade of ring buffers is created for each source host identified in the ring buffer of each port. For example, buffer 305*b* includes four slices of memory that identify four source hosts, sources A-D (309*a*-309*d*).

The sources A-D correspond to the source IP addresses 360*a*-360*d*, each being associated with the source hosts populated in the ring buffer 305*b*. Specifically, source A (309*a*) is associated with source IP address A (360*a*), source B (309*b*) is associated with source IP address B (360*b*), source C (309*c*) is associated with source IP address C (360*c*), and source D (309*d*) is associated with source IP address D (360*d*).

Cascading ring buffers for port 443 (375*b*) includes a cascade of ring buffers, one ring buffer for each source host identified in slices of the ring buffer for port 443 (305*b*). For example, a first buffer 310*a* for source host A, being an identifier for the source host A is created based on the source A 309*a* identified in a slice of port 443 (305*b*), is created based on the source A 309*a* identified in a slice of port 443 (305*b*), a second buffer 310*b* is created based on the source B 309*b* identified in a slice of port 443 (305*b*), a third buffer 310*c* is created based on the source C 309*c* identified in a slice of port 443 (305*b*), and a fourth buffer 310*d* is created based on the source D 309*d* identified in a slice of port 443 (305*b*). In other words, for each port, ports 1 through 65535, a ring buffer is created, and for each source host identified in a slice of memory in each port number, a ring buffer is created.

In the example embodiment 300*b*, the cascading ring buffers for port 443 (375*b*) includes a ring buffer 310*b* for source host B and each slice of memory in the ring buffer 310*b* includes a destination IP address 311 based on the requests made by the source B to a destination host of the network. For example, ten slices 0-9 are included in ring buffer 310*b*, where each slice, when applicable (e.g., a request is made), includes the destination IP address for the destination host.

The example buffer structure of FIG. 3B is beneficial for large networks as it may form a multi-dimensional array and is able to scale to different sizes based on the size of a network. A user of system may filter the data, first by port number, and then by source identifier. While the memory allocation is easily identified and scalable based on the finite, fixed set of ports (i.e., 65535 ports) multiplied by the amount of memory allocated to each buffer (e.g., 5 kilobytes) enables a user to determine that 327,675 kilobytes of memory is necessary for monitoring all ports using buffer sizes of 5 kilobytes.

In alternative example embodiments, a hybrid buffer structure may be used according to a combination of the buffer structure illustrated in FIG. 3A and the buffer structure illustrated in FIG. 3B. For example, if a user begins a buffer structure for a small network (e.g., 1000 hosts) according to the embodiment of FIG. 3A, and then determines that additional memory is necessary to continue processing the variables associated with the horizontal scan detection, the user may transfer the variables from the buffer structures of the embodiment of FIG. 3A to the buffer structures according to an embodiment of FIG. 3B in order to maintain state. The user may then continue to monitor for horizontal scanning using an embodiment according to FIG. 3B, which will provide additional memory.

In another example embodiment of a hybrid buffer structure, a user may transition from an example embodiment according to FIG. 3B to an example embodiment according to FIG. 3A in order improve the speed of the processing; for example, in an embodiment of FIG. 3B, the processing may take 10 seconds to multiple minutes, whereas in an embodiment according to FIG. 3A, the processing may take less than 10 seconds. According to example embodiments of the hybrid buffer structure, Classless Inter-Domain Routing (CIDR) may be used to provide the opportunity to size a network more appropriately for local needs.

FIG. 4A illustrates an example environment 400a where a horizontal port-scan attack against a host computer system may be detected as described herein at least in connection with FIG. 1 and in accordance with at least one embodiment.

The computing environment may comprise, for example, a server computer or any other system providing computing capability. Alternatively, the computing environment may employ a plurality of computing devices that may be arranged, for example, in one or more server banks, computer banks, or other arrangements. Such computing devices may be located in a single installation or may be distributed among many different geographical locations. For example, the computing environment may include a plurality of computing devices that together may comprise a computing resource service provider, a grid computing resource, and/or any other distributed computing arrangement. In some cases, the computing environment may correspond to an elastic computing resource where the allotted capacity of processing, network, storage, or other computing-related resources may vary over time.

Example embodiments of a control module (such as the control module described and depicted in FIG. 2) may perform horizontal port scan detection by aggregating the size of each buffer (e.g., based on the number of data entries in each buffer) in a horizontal direction. A horizontal aggregation may include counting the data elements in each buffer in the cascade of buffers based on the source address. For example, if a cascading buffer associated with a first source IP address contains three buffers (e.g., one buffer per port), the control module may compare the counts of each buffer in the cascade. For example, a horizontal count of cascading buffer 475c includes adding the number of destination IP addresses in each of buffers P1, P2, P3, and P4, and then comparing the total count of each buffer to each of the other buffers. In such a horizontal count, P1 may have four entries, P2 may have nine entries, P3 has zero entries, and P4 may have two entries. The outcome of such an example horizontal scan may then be entered into a log processing service and/or a heuristics unit.

In other example embodiments, a control module may perform a horizontal port scan detection by aggregating the size of each buffer (e.g., based on the number of data entries in each buffer) in a vertical direction. A vertical aggregation may include counting the data elements in one buffer per source address, where the buffer is used for the same port. For example, if buffers 475c P1, 475d P1, and 475e P1 are each associated with Port 80 from three different source hosts (e.g., Host C 402c, Host D 402d, and Host E 402e), the vertical buffer aggregation may count and compare the number of entries for each buffer. For example, if 475c P1 stores 10 entries, 475d P1 stores 15 entries, and 475e P1 stores 14 entries the size of each buffer is compared to each other.

In some example embodiments, the counts may be performed on an ongoing basis or during a specified time interval. The counts may further be continuously managed for ports that are most frequently requested, such as Ports 80 or 443. In addition, comparing the buffer entries in vertical and horizontal manners, the entries may be compared to previous buffer sizes during the same or different times of day, the average expected buffer size, a norm, plus standard deviation.

The data may be received and/or generated from sensors configured to record changes in a computer system, or from computer system logs, or may come from dedicated computer system hardware, or may come from processes, programs, modules, routers or services configured to detect computer system events, or may come from combinations of these and/or other such entities. Data, data sets, and/or unique data types may be received via connections and may be detected by one or more sensors 416a-c within the computing resource service provider. The one or more sensors may, in some embodiments, be computer system processes, modules, services, hardware devices, virtual devices, and/or other such computer system entities configured to at least receive and/or monitor connections associated with computer system environments. The one or more sensors may also be computer system logs and/or processes configured to monitor such computer system logs.

For example, a sensor may be a network traffic sensor such as a packet sniffer and may be configured to monitor network traffic on ports associated with computer systems running within the computer system and to report changes to connection statuses, port traffic, and/or other such network information. In other example embodiments, a sensor may be configured to detect network flow data from routers deployed on the network. An example embodiment of a sensor may include any NetFlow feature that provides the ability to collect network traffic. The sensor may provide for information related to the source and destination of traffic, class of service. causes of congestion, and the like. Further example embodiments of the sensor may be any network device on the network that is reporting network activity, network traffic monitor, or any other network traffic information that would include a source IP address, a destination IP address, and a port number. The sensor may further include receiving webserver logs for specific ports, which may be aggregated together and different sensor types can be collected.

The communications may be addressed to a host or server of a host computer system, such as the host computer system 250 as described and depicted in connection with FIG. 2, where the host or server is a destination host (e.g., may have a destination IP address assigned to the destination host). An attacker may be identified by, for example, the IP address of the machine that originates the communications requests to the host computer system. In some embodiments, the attacker may originate attacks from a plurality of attacking machines such as, for example, from a plurality of attacking machines running in a distributed and/or virtualized computer system environment. In such embodiments, the attacker may be identified by a set of IP addresses or by one or more IP addresses of routers, bridges, switches and/or other such network devices. For example, Hosts A-E (402a-

*e*) may be source hosts of an attacker, or Hosts B-1 and B-2 (402*b*-1 and *b*-2) may be source hosts that are embedded in the network via other hosts.

In some embodiments, the attacker may also be identified by one or more media access control (MAC) addresses of the attacking machines and/or by one or more MAC addresses of other network devices. When the attack is, for example, an email attack, the attacker may be identified in other ways, or may also be identified by one or more sending email addresses. Other identifiers, such as instant messaging system usernames, social media account identifiers and others may be used and the identifier(s) that is/are used may vary according to the systems used to attack.

As each of the hosts 402*a*-*e* (including 402*b*-1 and 402*b*-2) send communications requests 403*a*-*e* (including 403*b*-1 and 403*b*-2) to any number of destination IP addresses, the requests are parsed by a management unit, such as the data structure management unit 205 as described and depicted in connection with FIG. 2, and the unique identifier, such as the destination IP address, is stored in a buffer associated with the port in the request. For example, Host A 402 may transmit communications requests 403*a* to three different ports of three different destination IP addresses. For Host A, a cascading buffer ring 475*a* is created, such that one buffer is created per port requested. In other words, the cascading buffer ring 475*a* includes three buffer rings P1, P2, and P3, where the first port is associated with buffer P1, the second port is associated with buffer P2, and the third port is associated with buffer P3. As each request is parsed, the destination IP address associated with each port is stored in the appropriate buffer. For example, one request of multiple communications requests 403*a* includes a two-tuple sequence including a requested port (port *a*-1) and a destination IP address.

Each cascading ring buffer 475*a*-*e* (including 475*b*-1 and 475*b*-2) may include a different number of buffers based at least in part on the number of ports requested by the source hosts. For example, cascading ring buffer 475*b*-1 has two buffers, which would have been created because two ports had been requested in different communications requests transmitted by Host B-1 (402*b*-1) to the host computing system.

In other examples, cascading ring buffer 475*b*-2 comprises three ring buffers, cascading ring buffer 475*c* comprises four ring buffers, cascading ring buffer 475*d* comprises three ring buffers, and cascading ring buffer 475*e* includes two ring buffers. As noted throughout, each cascading ring buffer may include up to 65,535 buffers, if every port were identified in a request.

FIG. 4B is an illustrative example of an environment 400*b* depicting communications traffic transmitted via a series of port numbers and associated with source identifiers in cascading ring buffers in accordance with at least one embodiment.

The example embodiment of FIG. 4B corresponds with the buffer structure of FIG. 3B. Example embodiments of a control module (such as the control module described and depicted in FIG. 2) may perform horizontal port scan detection by aggregating the size of each buffer (e.g., based on the number of data entries in each buffer) in a horizontal direction. A horizontal aggregation may include counting the data elements in each buffer in the cascade of buffers based on the port number (ports 1-65535), such as port 1 (410*a*), port 80 (410*b*), port 1024 (410*c*), port 3500 (410*d*), and port 65535 (410*e*). For example, if a cascading buffer associated with a first port contains three buffers (e.g., one buffer per source host), the control module may compare the counts of each buffer in the cascade 480*a*. For example, a horizontal count of cascading buffer 480*a* includes adding the number of destination IP addresses in each of buffers S1, S2, and S3, and then comparing the total count of each buffer to each of the other buffers. In such a horizontal count, S1 may have four entries, S2 may have nine entries, and S3 may have zero entries. The outcome of such an example horizontal scan may then be entered into a log processing service and/or a heuristics unit.

As each of the hosts 410*a*-*e* send communications requests 403*b*-1 through 403*b*-5 to any number of destination IP addresses, the requests are parsed by a management unit, such as the data structure management unit 205 as described and depicted in connection with FIG. 2, and the unique identifier, such as the destination IP address, is stored in a buffer associated with the source in the request. For example, port 1 410*a* may transmit communications requests 403*b*-1 to three different sources. For port 1, a cascading buffer ring 480*a* is created and/or maintained, such that one buffer is created per source host requested. In other words, the cascading buffer ring 480*a* includes three buffer rings S1, S2, and S3, where the first source host is associated with buffer S1, the second source host is associated with buffer S2, and the third source host is associated with buffer S3. As each request is parsed, the destination IP address associated with each source host is stored in the appropriate buffer. For example, one request of multiple communications requests 403*b*-1 includes a two-tuple sequence including a source host (source S1) and a destination IP address.

Alternative example embodiments may include monitoring a minimum of three measurable variables or components and creating and/or populating data structures with the variables in order to track and/or recognize patterns or occurrences on a network, network device (e.g., Universal Serial Bus (USB) device, FireWire connection), messaging services (e.g., email), and the like. In other words, examples may include tracking at least three distinct, but related, measurable points, where one of the points preferably has a finite set of components. Three measurable variables may include origination information, destination information, and communication-specific information. For example, with respect to monitoring a network for horizontal port scanning, the source Internet protocol (IP) address may be the origination information, the destination IP address may be the destination information, and the port number may be the communication-specific information.

In another example, with respect to monitoring a USB device for access information, the USB device identifier may be the origination information, a user identifier (ID) of a computer may be the destination information, and an event may be communication-specific information. For example, the USB device identifier is tracked with related elements, such as the user ID and a specific time that the USB device is connected to the USB port. In yet another example, with respect to electronic mail monitoring for potential viruses, an email sender may be the origination information, the email recipient may be the destination information, and a type of attachment (e.g., PDF, JPEG, etc.) to the email may be the communication-specific information.

Figure 5:
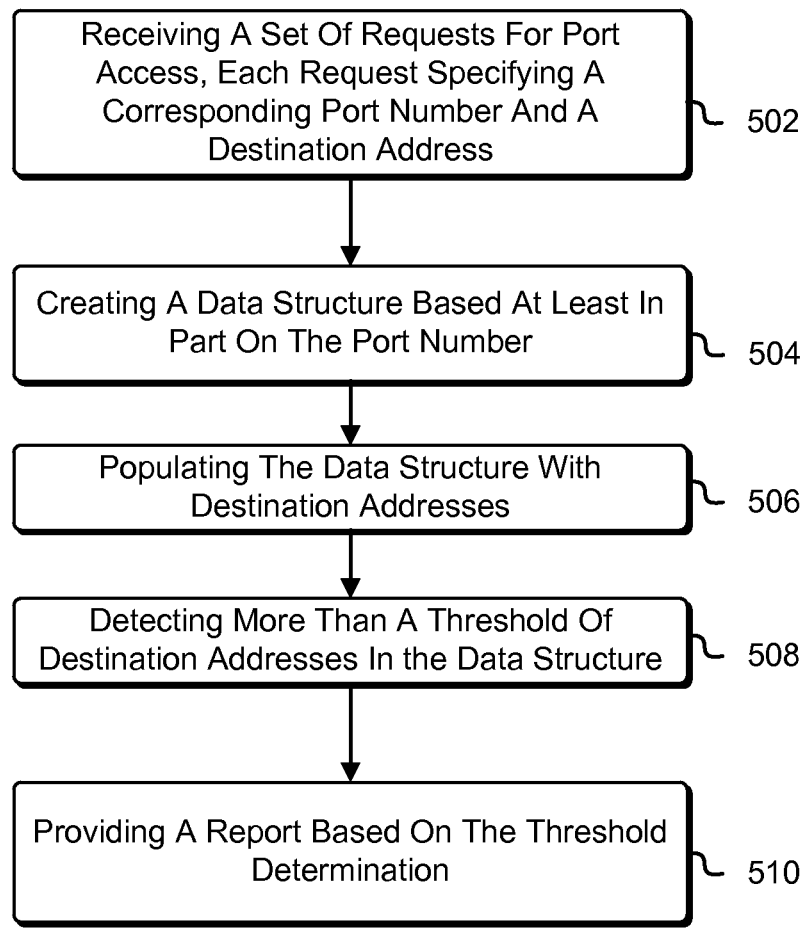
FIG. 5 is an illustrative example of a process for receiving requests for port access in accordance with at least one embodiment.

FIG. 5 illustrates an example process 500 for detecting horizontal port scanning as described herein at least in connection with FIG. 2 and in accordance with at least one embodiment. A host computer system, such as the host computer system 250 described and depicted in connection with FIG. 2, may perform at least a portion of the process illustrated in FIG. 5. Other entities operating with a computer system environment may also perform at least a portion of the process illustrated in FIG. 5 including, but not limited to, services, applications, modules, processes, operating system elements, virtual machine elements, network hardware, or combinations of these and/or other such entities operating within the computer system environment.

The host computer system may receive a set of requests for port access, where each request specifies a port number and a destination address (502). For example, an attacker, via a source Internet protocol (IP) address, may initiate a horizontal port-scan attack by first issuing a connection request to a port on the host computer system. In response to receiving communications requests, the host computer system may create one or more ring buffers based at least in part on the port number for which access was requested (504). For example, if three ports were requested by the same source IP address, the host computer system would create and/or maintain three ring buffers, one buffer per port number.

Based at least in part on the destination addresses received as part of the set of requests, the host computer system may populate designated sections of each ring buffer with data related to the destination, such as a destination IP address (506). At some point, a threshold value may be detected, by the host computer system, such that the threshold value is reached or exceeded, the value being a number of entries stored in each ring buffer (508). For example, a threshold value may be determined based at least in part on a set of conditions, which may be a dynamic set of conditions configured by the system or by a user of the system, such as a network administrator. The set of conditions may, for example, determine when a buffer is filling too quickly and should be considered to store identifiers associated with a popular port, which should be ignored or focused on depending on the user preferences. For example, Port 80 is a port that receives large quantities of traffic (e.g., thousands of requests every minute), which may be consuming too much memory or producing too many results that are not of interest to the user. In response to the threshold value having been detected, the host computer system may be configured to generate a report or log of data related to possible horizontal port scanning received on the network (510). For example, as explained in detail above in connection with FIG. 4A or FIG. 4B, the host computer system may use different methods of calculating a threshold (e.g., vertical and/or horizontal aggregation of data) in order to determine the possible detection of an attacker. The threshold values may be continuously monitored, for example, by a control module such as the control module 240 described and depicted in connection with FIG. 2, and the threshold values may be monitored to create a threshold profile. The threshold profile may provide information related to the status of a buffer, such as the filling of the buffers.

Figure 6:
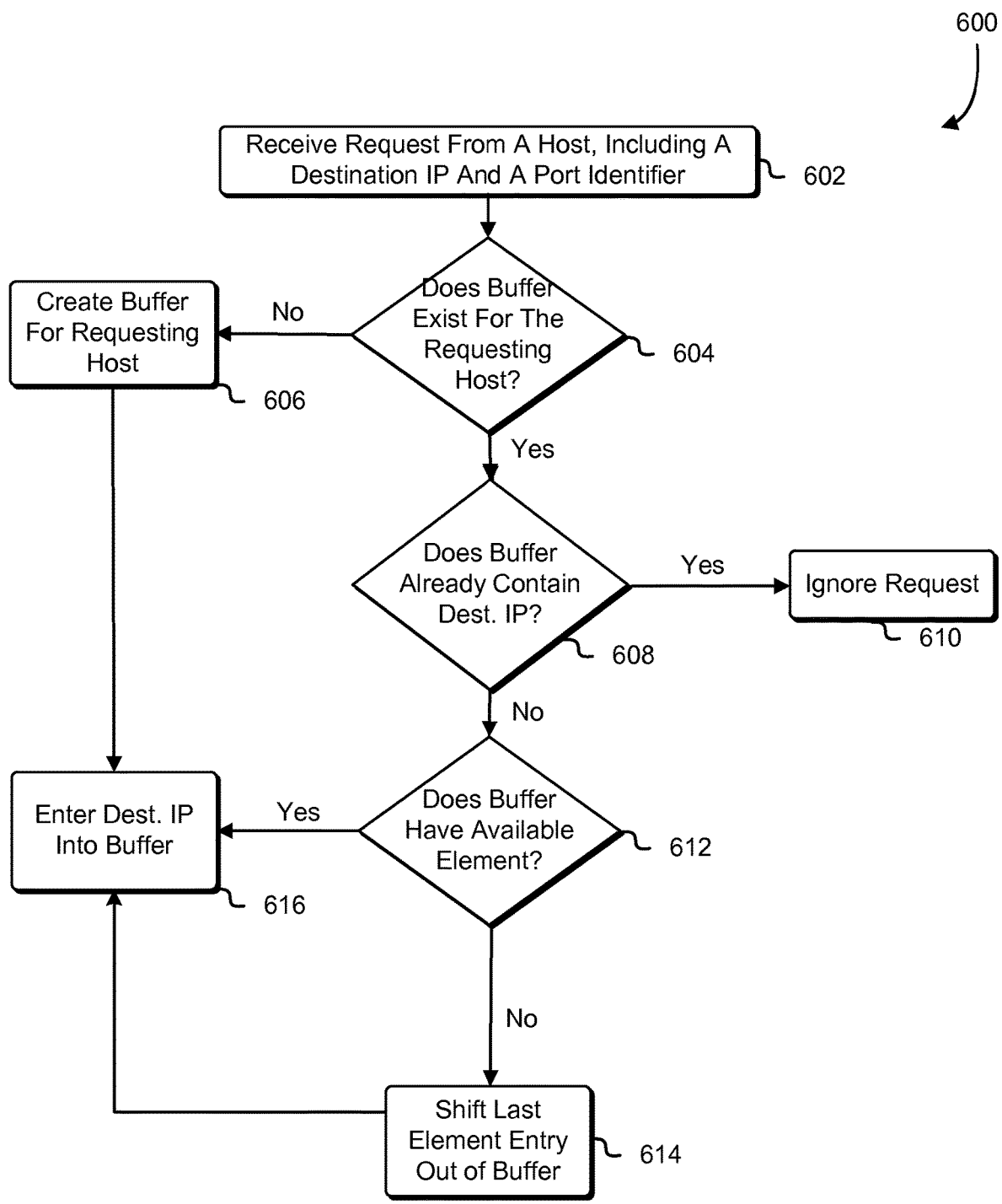
FIG. 6 is an illustrative example of a process for creating and/or populating ring buffers with destination protocol addresses in accordance with at least one embodiment.

FIG. 6 illustrates an example process 600 for creating, maintaining, and/or populating ring buffers as described herein at least in connection with FIG. 3A or FIG. 3B and in accordance with at least one embodiment. A host computer system, such as the host computer system 250 described and depicted in connection with FIG. 2, may perform at least a portion of the process illustrated in FIG. 6. Other entities operating with a computer system environment may also perform at least a portion of the process illustrated in FIG. 6 including, but not limited to, services, applications, modules, processes, operating system elements, virtual machine elements, network hardware, or combinations of these and/or other such entities operating within the computer system environment.

The host computer system may receive one or more requests, such as communications requests, from a source address, where the source address is an Internet protocol (IP) address of a host device performing a horizontal scan (602). The communications request from the source IP address may include normal traffic content, such as packet size, a protocol type, port number, destination IP address, etc. The host computer system may identify the port number and the destination IP address from the communications request in order to determine where to store the data. The host computer system is configured to determine, based on the received port number, if a ring buffer exists for the requested port (604). If a ring buffer for that port has not already been created or is not already being maintained, the ring buffer for the new port number will be created (606). Once the ring buffer for that port is created, the host computer system is configured to store the destination IP address in a slice of the ring buffer (616).

In an example embodiment where the ring buffer for that port does exist, the host computer system is configured to determine if the destination IP address is already contained in that buffer (608). If the buffer already contains that destination IP address, the IP address is ignored, as in, it already exists in the counter and is not added again (610). If the buffer does not contain the received destination IP address, the host computer system is further configured to determine if the ring buffer has an available element (slice) in which a new entry can be inputted (612).

If the buffer does have an available slice, the ring buffer entries will shift according to the FIFO method and the destination IP address is entered into the next available slice (616). If the buffer does not have any available elements, the last element in the buffer will be rotated out of the buffer according to the FIFO method (614) and the destination IP address is entered into the newly available slice (616).

Figure 7:
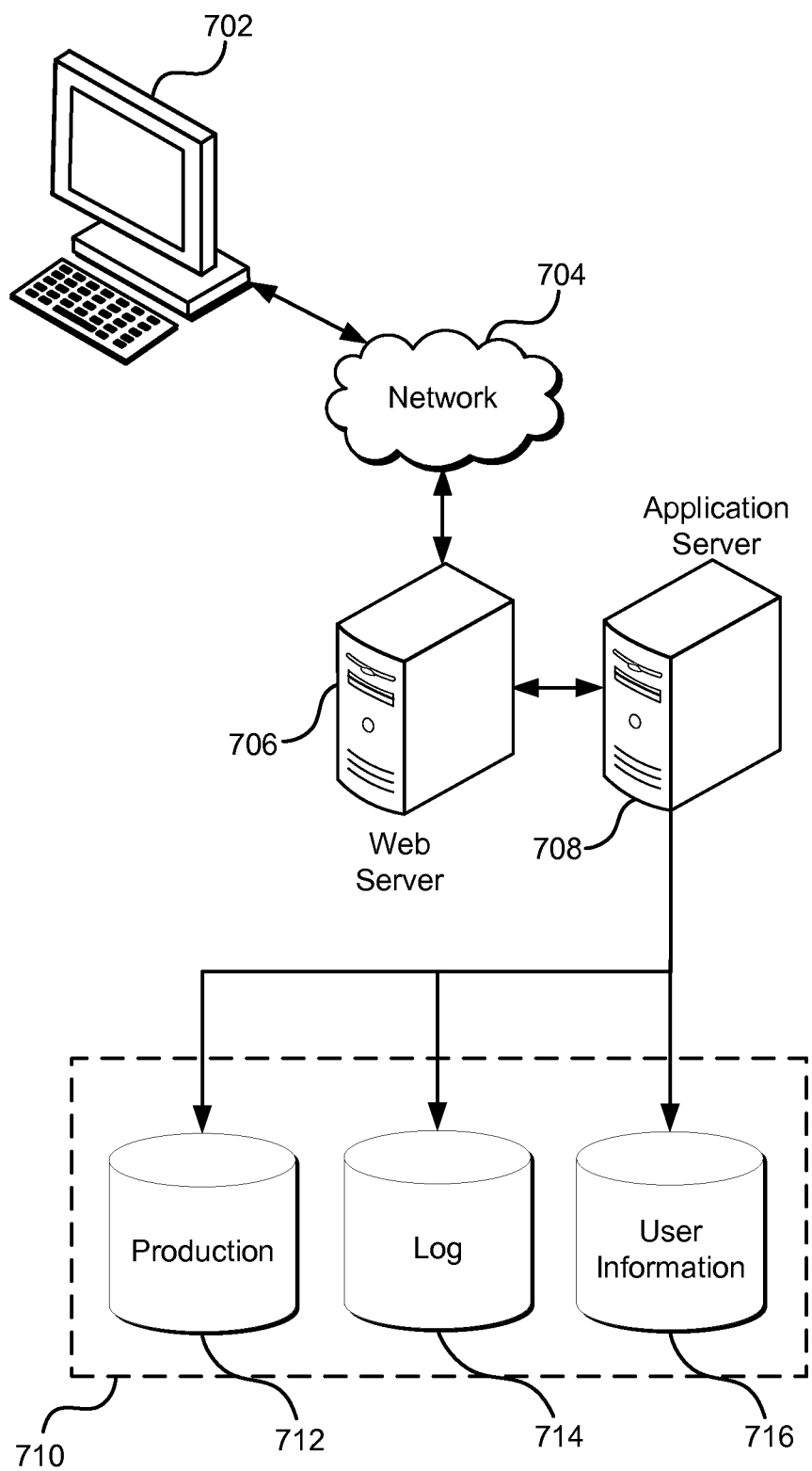
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 702 and the application server 708, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining information that describes a plurality of communications requests associated with a network interface of a source computer system, the plurality of communication requests comprising at least:
      a first request indicating a first destination having an associated first network address and a first port, and
      a second request indicating a second destination having an associated second network address and a second port;
   generating, in response to the plurality of communications requests associated with the network interface of the source computer system, a plurality of ring buffers that are generated to store information related to communication requests originating with the source computer system, including a first ring buffer and a second ring buffer storing information associated with port numbers corresponding to the first and second ports, the plurality of ring buffers including the first ring buffer associated with the first port, and the second ring buffer associated with the second port;
   storing an entry that identifies the first destination to the first ring buffer;
   storing another entry that identifies the second destination to the second ring buffer, the first ring buffer and the second ring buffer being located in memory of at least one computing device;
   determining an occurrence of a port scan at least by detecting presence of more than a threshold number of entries representing a plurality of different destinations in the first ring buffer of the plurality of ring buffers;
   transmitting information indicating the occurrence of the port scan, and
   preventing, based at least in part on the information, a third request from the source computer system from being fulfilled.

2. The computer-implemented method of claim 1, wherein storing an entry into the first ring buffer corresponding to the first port is based at least in part on a port number included in a communication request of the plurality of communication requests.

3. The computer-implemented method of claim 1, further comprising generating a cascade of ring buffers to be associated with the source, the cascade of ring buffers including the first ring buffer associated with a first port number and the second ring buffer associated with a second port number.

4. The computer-implemented method of claim 1, further comprising generating a cascade of ring buffers to be associated with the source computer system, the cascade of ring buffers including the first ring buffer associated with a first source identifier and the second ring buffer associated with a second source identifier.

5. The computer-implemented method of claim 1, further comprising generating a report, wherein generating the report comprises:
   counting entries in the first ring buffer and the second ring buffer;
   calculating a standard deviation of the count of entries of multiple ring buffers, the multiple ring buffers being associated with the source computer system or the port number; and
   identifying, based at least in part on the standard deviation, one or more ring buffers of the multiple ring buffers.

6. A system, comprising at least one computing device configured to implement one or more services, wherein the one or more services:
   generate a plurality of preset data structures, including a plurality of ring buffers, in response to resource access requests being received, the plurality of ring buffers storing, in memory of the at least one computing device, information related to the resource access requests originating from a source with an associated network address, different preset data structures of the plurality of preset data structures storing information associated with a different communication-specific information, the plurality of preset data structures including a first preset data structure associated with a first communication-specific information, and a second preset data structure associated with a second communication-specific information;
consequent to receiving, from the source, a first resource access request that includes first communication-specific information and first destination information, store an entry that is based at least in part on the first destination information into the first preset data structure;
consequent to receiving, from the source, a second resource access request that includes second communication-specific information and second destination information, store another entry based at least in part on the second destination information into the second preset data structure;
consequent to detection of more than a threshold number of entries representing a plurality of different destinations in a preset data structure of the plurality of preset data structures, transmit information indicating an occurrence of a port scan and identifying the source; and
perform an action to prevent fulfillment of a third resource access request received from the source.

7. The system of claim 6, wherein the one or more services are further configured to generate a cascade of preset data structures for the source, the cascade of preset data structures including the first preset data structure associated with the first communication-specific information and the second preset data structure associated with the second communication-specific information.

8. The system of claim 7, wherein the one or more services are further configured to:
count the entries in the first preset data structure associated with the first communication-specific information and the second preset data structure associated with the second communication-specific information;
calculate a standard deviation among the first preset data structure associated with the first communication-specific information and the second preset data structure associated with the second communication-specific information; and
determine, based at least in part on the standard deviation, a set of outlier preset data structures.

9. The system of claim 6, wherein the one or more services are further configured to generate a plurality of cascades of preset data structures, wherein:
a third preset data structure is associated with the source and a fourth preset data structure is associated with the source; and
the third preset data structure and the fourth preset data structure are associated with a same communication-specific information.

10. The system of claim 9, wherein the one or more services are further configured to:
compare the first preset data structure associated with the source and the second preset data structure associated with the source;
count the entries in the first preset data structure and the second preset data structure;
calculate a standard deviation among the first preset data structure and the second preset data structure; and
based at least in part on the standard deviation, determine a set of outlier preset data structures.

11. The system of claim 6, wherein the one or more services are further configured to determine a threshold of entries in the preset data structure, wherein the threshold of entries is based at least in part on the first communication-specific information, the second communication-specific information, and the source.

12. The system of claim 11, wherein the one or more services are further configured to update a threshold profile of the first preset data structure and the second preset data structure, wherein the threshold profile is based at least in part on the entries in the first preset data structure and the second preset data structure exceeding the threshold.

13. A non-transitory computer-readable storage medium storing thereon executable instructions that, if executed by one or more processors of a computer system, cause the computer system to:
maintain a set of data structures in memory of at least one computing device to store information related to communications from a computing device with an associated network address, different data structures of the set of data structures storing information associated with a different communication-specific information, the set of data structures including a first data structure corresponding to a first communication-specific information and a second data structure corresponding to a second communication-specific information, the set of data structures including a plurality of ring buffers created in response to the communications associated with the network address being received;
populate the set of data structures with entries based at least in part on destination information specified in one or more requests from the computing device by:
as a result of a first request specifying the first communication-specific information, storing an entry that includes a first destination information, into the first data structure; and
as a result of a second request specifying the second communication-specific information, storing another entry that includes a second destination information, into the second data structure, the one or more requests including the first request and the second request; and
consequent to more than a threshold number of entries in a data structure of the set of data structures identifying a set of different destination information, perform one or more operations that include:
transmitting information that indicates an occurrence of a port scan; and
preventing fulfillment of another request from the computing device.

14. The non-transitory computer-readable storage medium of claim 13, wherein the executable instructions further comprise instructions that, if executed by the one or more processors, cause the computer system to generate the first data structure in response to the first request, from the computing device, specifying the first communication-specific information and generate the second data structure in response to the second request, from the computing device, specifying the second communication-specific information.

15. The non-transitory computer-readable storage medium of claim 13, wherein the executable instructions further comprise instructions that, if executed by the one or more processors, cause the computer system to generate a cascade of data structures, the cascade being associated with the computing device and the first data structure and the second data structure.

16. The non-transitory computer-readable storage medium of claim 15, wherein the executable instructions that cause the computer system to generate the cascade of data structures further include instructions that cause the computer system to calculate a standard deviation of entries in the first data structure and the second data structure.

17. The non-transitory computer-readable storage medium of claim 16, wherein the executable instructions further comprise instructions that, if executed by the one or more processors, cause the computer system to:
create a communication-specific connection log associated with communication-specific information, wherein the communication-specific connection log is based at least in part on the standard deviation; and
update the communication-specific connection log if the entries in the first data structure or the entries in the second data structure exceed a mean plus standard deviation.

18. The non-transitory computer-readable storage medium of claim 13, wherein the executable instructions that cause the computer system to update an attack profile associated with the computing device, wherein the attack profile is based at least in part on the first communication-specific information and the destination information specified in the one or more requests.

19. The non-transitory computer-readable storage medium of claim 13, wherein the executable instructions further comprise instructions that, if executed by the one or more processors, cause the computer system to determine a threshold of entries of the first data structure and the second data structure, wherein the threshold of entries is based at least in part on a number of destination information in the first data structure and a number of destination information in the second data structure.

20. The non-transitory computer-readable storage medium of claim 19, wherein the executable instructions that cause the computer system to determine the threshold of entries further include instructions that cause the computer system to ignore the first data structure if the number of destination information in the first data structure exceeds the threshold of entries or ignores the second data structure if the number of destination information in the second data structure exceeds the threshold of entries.

* * * * *